US010681207B1

(12) United States Patent
Johnson et al.

(10) Patent No.: US 10,681,207 B1
(45) Date of Patent: Jun. 9, 2020

(54) CALLER IDENTITY VERIFICATION BASED ON UNIQUE MULTI-DEVICE SIGNATURES

(71) Applicant: International Business Machines Corporation, Armonk, NY (US)

(72) Inventors: Richard C. Johnson, Selkirk, NY (US); Spyridon Skordas, Troy, NY (US); Lawrence A. Clevenger, Saratoga Springs, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/253,805

(22) Filed: Jan. 22, 2019

(51) Int. Cl.
*H04M 3/42* (2006.01)
*G06N 20/00* (2019.01)
*H04W 4/80* (2018.01)

(52) U.S. Cl.
CPC ........ *H04M 3/42059* (2013.01); *G06N 20/00* (2019.01); *H04M 3/42042* (2013.01); *H04W 4/80* (2018.02); *H04M 2203/6045* (2013.01)

(58) Field of Classification Search
CPC ....... H04W 4/001; H04W 4/008; H04W 4/80; H04W 4/06; H04W 48/10; H04W 84/18;
(Continued)

(56) References Cited

U.S. PATENT DOCUMENTS 7,945,512 B2   5/2011  Scipioni et al.
9,060,057 B1   6/2015  Danis
(Continued)

FOREIGN PATENT DOCUMENTS

CN       107944853       4/2018
WO    WO2013/189438 A2   12/2013
(Continued)

OTHER PUBLICATIONS

List of IBM Patents or Patent Applications Treated as Related, Nov. 8, 2019, 2 pages.

(Continued)

*Primary Examiner* — Binh Kien Tieu
(74) *Attorney, Agent, or Firm* — Francis Lammes; Stephen J. Walder, Jr.; Jeffrey S. LaBaw

(57) ABSTRACT

Communication source identifier verification system mechanisms are provided. The mechanisms receive communication information for a communication initiated between a source communication system and a destination communication system. The communication information comprises a source identifier and a local device identifier signature specifying zero or more local device identifiers of devices local to the source communication system. The mechanisms retrieve valid device identifier information for an authorized communication source corresponding to the identifier of the source communication system. The mechanisms execute a verification operation that verifies whether the source identifier is validly associated with the source communication system based on the retrieved valid device identifier information and the local device identifier signature. The mechanisms send a verification notification along with the communication information, in response to results of executing the verification operation, to the destination communication system.

20 Claims, 5 Drawing Sheets

(58) Field of Classification Search
CPC ... H04W 88/06; H04W 4/50; H04W 3/42178;
G06Q 20/18; G06Q 20/20; G06Q 20/24;
G06Q 20/382; G06Q 20/3278
USPC ............ 379/142.01, 142.05, 142.06, 142.17;
455/414.1, 415, 422.1
See application file for complete search history.

(56) References Cited

U.S. PATENT DOCUMENTS

| | | | | |
|---|---|---|---|---|
| 9,881,305 | B1* | 1/2018 | Lewis | ................... G06Q 20/405 |
| 10,216,917 | B2 | 2/2019 | Johnson | |
| 2003/0120571 | A1 | 6/2003 | Blagg et al. | |
| 2004/0172368 | A1 | 9/2004 | Johnson | |
| 2014/0370879 | A1* | 12/2014 | Redding | ........... H04M 3/42178 |
| | | | | 455/419 |
| 2015/0043724 | A1* | 2/2015 | Farris | ................ H04M 3/42059 |
| | | | | 379/142.05 |
| 2016/0066162 | A1* | 3/2016 | Schulz | ............... G06Q 30/0207 |
| | | | | 455/41.2 |
| 2016/0111085 | A1* | 4/2016 | Brunn | ................. H04L 65/1069 |
| | | | | 379/88.02 |
| 2018/0197175 | A1 | 7/2018 | Groarke | |
| 2018/0232734 | A1 | 8/2018 | Smets et al. | |
| 2018/0249005 | A1 | 8/2018 | Dowlatkhah et al. | |
| 2019/0281157 | A1* | 9/2019 | Gupta | ................. H04M 3/2281 |

FOREIGN PATENT DOCUMENTS

| | | |
|---|---|---|
| WO | WO2016/021978 A1 | 2/2016 |
| WO | WO2018/133718 A1 | 7/2018 |

OTHER PUBLICATIONS

Brodkin, Jon, "Scammer who made 96 million robocalls should pay $120M fine, FCC says", Ars Technica, Jun. 22, 2017, 5 pages.

* cited by examiner

CALLER IDENTITY VERIFICATION BASED ON UNIQUE MULTI-DEVICE SIGNATURES

BACKGROUND

The present application relates generally to an improved data processing apparatus and method and more specifically to mechanisms for providing caller identify verification based on unique multi-device signatures.

Unwanted solicitation calls, such as from call centers, automated telephone systems, telemarketers, and the like, whether legitimate or illegitimate, are a major nuisance in modern society. Such solicitation calls may be legitimately from a person, company, or other organization attempting to sell products or services to the called person, solicit information from the called person, such as in the case of voter polling, opinion polls, and the like. Other solicitation calls may be from individuals attempting to use nefarious means to access the called person so that they will relinquish private information, provide access to accounts, simply determine whether the person is present in the home, or any of a number of other reasons.

Whether legitimate or illegitimate, many times recipients of telephone calls are not interested in speaking with the caller. Often, called parties utilize caller-ID services to give them an indication of the source of a telephone call in an effort to screen calls from parties that the called party is not interested in speaking with. If an incoming call is from an unwanted party, then the called party need not answer the telephone. Some mechanisms allow for automated blocking of telephone calls from parties added to a blacklist where the determination may also be based on caller-ID mechanisms.

One tell-tale indicator of a call being originated from an unwanted source is the call originating from a non-local telephone number, toll free number, or the like. Other indicators may include the caller-ID information indicating a caller unknown or caller-ID blocked name.

Recently, unscrupulous entities involved in telemarketing and other types of solicitation calls use caller-ID spoofing to portray themselves as a source of the telephone call that is false. For example, caller-ID spoofing may be used to cause caller-ID mechanisms to show a local phone number, and even phone numbers with which the called party is familiar with, e.g., friends, family, and the like, to fool called parties into accepting the telephone calls. For example, there have been reports that robocall mechanisms may make millions of calls spoofing local telephone numbers in a relatively short period of time in order to trick called parties into buying goods or services.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, wherein the at least one memory comprises instructions that are executed by the at least one processor to cause the at least one processor to be specifically configured to implement a communication source identifier verification system. The method comprises receiving, by the communication source identifier verification system, communication information for a communication initiated between a source communication system and a destination communication system. The communication information comprises a source identifier and a local device identifier signature specifying zero or more local device identifiers of devices local to the source communication system. The method further comprises retrieving, by the communication source identifier verification system, valid device identifier information for an authorized communication source corresponding to the identifier of the source communication system. In addition, the method comprises executing, by the communication source identifier verification system, a verification operation that verifies whether the source identifier is validly associated with the source communication system based on the retrieved valid device identifier information and the local device identifier signature. Moreover, the method comprises sending, by the communication source identifier verification system, a verification notification along with the communication information, in response to results of executing the verification operation, to the destination communication system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
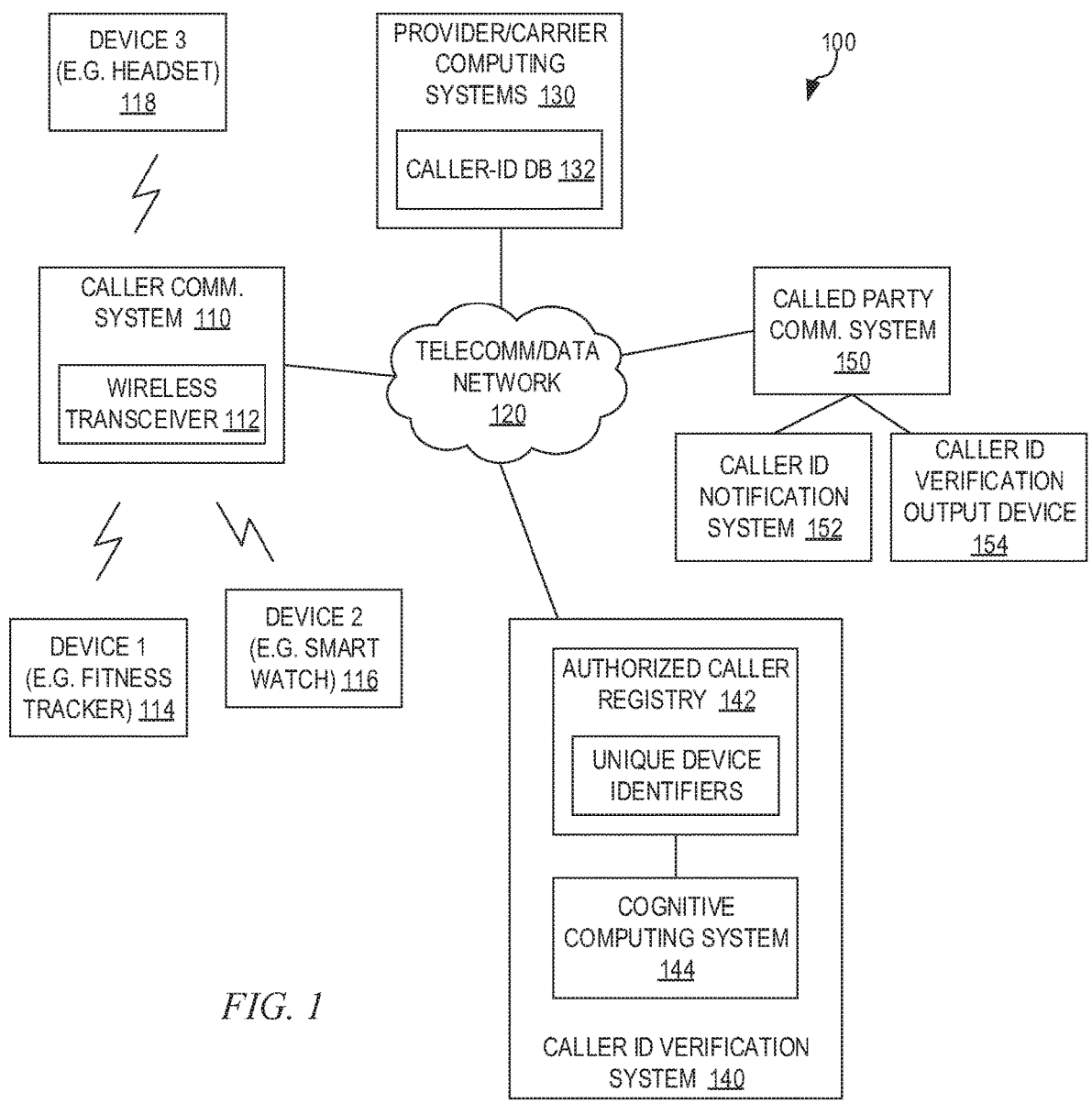
FIG. 1 illustrates a functional block diagram of an example caller identification verification system in accordance with one illustrative embodiment.

As mentioned above, caller identification (caller-ID) spoofing is a prevalent problem to the point where the average person cannot always rely on caller-ID mechanisms to give them an accurate identification of the persons, organizations, or other entities that are initiating telephone calls to them. For example, a called party, seeing a caller-ID notification indicating a local telephone number may be more likely to answer the telephone call than if the caller-ID indicated an "out of area" caller-ID, a non-local telephone number, a toll-free number, an "Unknown" caller-ID, or the like. Thus, by performing caller-ID spoofing, the caller is able to fool the called party into believing the call is from a local source, or even a source with which the called party is familiar, such as a friend or relative. Hence, it would be beneficial to have a mechanism that prevents unscrupulous parties from being able to successfully implement caller-ID spoofing, and instead provide a warning to called parties as to the likelihood of the presence of caller-ID spoofing.

The illustrative embodiments provide mechanisms for verifying the caller-ID information of a source of a telephone call based on a signature obtained from unique identifiers of devices, e.g., Internet of Things (IoT) devices, associated with the valid source that the caller-ID information purports to be. For example, the illustrative embodiments may utilize a mechanism similar to that described in co-pending and commonly assigned U.S. patent application Ser. No. 15/651,555, filed Jul. 17, 2017, and entitled "Identity Validation Using Local Environment Information," which is hereby incorporated by reference. With the mechanism described in this co-pending and commonly assigned application, a plurality of the authorized user's registered mobile devices are verified as being present at the physical location where a transaction is being performed or initiated, potentially with a weighting mechanism being utilized to weight different mobile device identities relative to others, where the weights are determined based on different criteria depending on the desired implementation. For example, a user's mobile phone identity, fitness tracker identity, smart watch identity, and/or the like, may be verified in combination with one another, along with credit card or account information, in order to verify that the user is a verified user of the credit card or account that is being used to complete a transaction. The combination of specific identifiers of devices, e.g., IoT devices, associated with the user represents a unique user signature which is the basis of a fuzzy or cognitive evaluation of the likelihood that the user is the authorized person associated with the credit card or account information.

The illustrative embodiments utilize a similar multi-factor authentication mechanism to verify the identity of a source of a communication, such as a telephone call, and thereby verify source information included in the communication, such as in the case of caller-ID information that is displayed to the recipient of the communication. That is, authorized callers are registered in an authorized caller database along with unique identifiers of their associated various wearable, portable, or other Internet of Things (IoT) devices, subsets of which, or all of which, together may constitute a signature of the authorized callers. An unscrupulous party attempting to perform caller-ID spoofing or other spoofing of a source of a communication, will likely not have access to the specific combination of device identifiers associated with the authorized caller's devices. Thus, even though the unscrupulous party, or fraudster, may adopt the identity of the authorized user, such as via a spoofed caller-ID, the validity of the identity of the source of the call, i.e. the caller-ID information, may be verified by checking the specific device identifiers, or device signature, of the authorized caller whose identity the fraudster is assuming. The fraudster may send zero or more device identifiers in their attempt to spoof the caller-ID information. In sending zero device identifiers, the mechanisms of the illustrative embodiments will not be able to verify the caller-ID information and will indicate the non-verifiable nature of the caller-ID information. In sending one or more device identifiers, it is unlikely that the fraudster will have the correct device identifiers or combination of device identifiers that validly identify the identity that the fraudster has adopted and thus, again, the mechanisms of the illustrative embodiments will identify the caller-ID information as not being verified.

With the mechanisms of the illustrative embodiments, the source of communications is verified based on the particular combination of one or more devices locally present at the physical location of the source of the communication. For example, if a caller initiates a telephone call to a called party, a local wireless communication operation is performed to identify the particular devices, e.g., IoT devices, present in the local vicinity of the source of the call. The unique identifiers of the devices present are combined to generate a signature that is sent along with he telephone call as caller-ID verification information. Again, this signature may comprise zero or more unique device identifiers. The caller-ID information itself is obtained through existing techniques and databases of the telecommunication service provider, however these may be extended in accordance with the illustrative embodiments to include an authorized caller registry of unique identifiers of valid devices associated with authorized or valid callers. This registry may be used to compare the signature generated from the identifiers of the devices at the local vicinity of the source of the telephone call, if any, to the registered unique device identifiers to determine a likelihood that the telephone call is originating from the source that the caller-ID information purports the telephone call is originating from. If the signature is a sufficient match to the registered unique device identifier information, it can be determined that the telephone call is originating from the source purported in the caller-ID information. A notification can be sent to the called party, such as via an extended caller-ID display message or other output of a notification, indicating whether or not the caller-ID information for the telephone call can be relied up as being valid or not based on the comparison of the signature to the registered unique device identifier information.

Thus, when the fraudster initiates a telephone call, for example, the fraudster will not be able to provide a sufficiently high matching signature of local devices to that of the registered unique device identifiers as the fraudster will either not include any device identifier signature or will send false device identifier signature information that is unlikely to match the valid device information for the authorized caller-ID they are attempting to spoof. As a result, while the caller-ID information from the fraudster may indicate that they are a particular local party, which they are not, the requirement for a matching signature of local devices will provide a verification of the caller-ID information and indicate whether the called party can rely on the caller-ID information or not. In the case of a fraudster, a notification may be output indicating that the caller-ID information is "not verified". In the case of an authorized caller that has a sufficiently high matching signature of local device identifiers at the source of the telephone call, the notification may indicate that the caller-ID information is "verified."

Thus, with the mechanisms of the illustrative embodiments, recipients of communications with source identifier information, such as telephone calls with corresponding caller-ID information, may be provided with an indication as to whether or not they can rely on the caller-ID information to be accurate or not. As a result, the recipients of the communications are given greater confidence that the caller-ID information that they receive along with the communication accurately, or inaccurately, represents the actual source of the communication. Thus, recipients of communications may respond to communications with minimized risk of being exposed to fraudsters.

It should be appreciated that while the illustrative embodiments will be described herein with regard to caller-ID information of telecommunications systems, the illustrative embodiments are not limited to such. Rather, the mechanisms of the illustrative embodiments may be implemented with any communications system in which an identifier of a source of a communication is included with the communication and is subject to spoofing. For example, the mechanisms of the illustrative embodiments may be used with instant messaging systems, text messaging systems, electronic mail systems, or the like. In such cases, when a communication is to be sent, the devices local to the source of the communication may be interrogated for their unique identifiers in order to generate a signature that may be compared against registered authorized communication sources to determine if the source of the communication is likely the authorized communication source that the source identifier information purports to be. A corresponding notification may then be included with the source identifier information to indicate whether it is verified or not.

Having summarized elements of various illustrative embodiments above, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a functional block diagram of an example caller-ID verification system in accordance with one illustrative embodiment. The example shown in FIG. 1 is for a telecommunications-based communication system, which may be implemented in digital, analog, or a combination of digital and analog technologies. In some illustrative embodiments, the telecommunications network(s) 120 shown in FIG. 1 may be implemented as wired and/or wireless communications networks. In some embodiments, the telecommunications network(s) may comprise cellular communication networks, data networks in which voice over IP (VOIP) or other similar technologies are implemented, or any other analog or digital based communication networks. For purposes of the description of the illustrative embodiments, it will be assumed that the telecommunication network(s) 120 are digital or data based networks, where communications are transmitted as data streams.

As shown in FIG. 1, with the mechanisms of the illustrative embodiments, a source communication system 110, or "caller" communication system 110 in the example of a telecommunications system, is equipped with a wireless transceiver mechanism 112, such as a radio transceiver, Bluetooth transceiver, WiFi transceiver, or the like. The caller communication system 110 may be any type of telecommunications system including land line telephones, mobile telephones, smart telephones in which computing devices are included, or the like. In the depicted example, it is assumed that the caller communication system 110 is a wired or wireless telephone system employing a data based communication protocol, such as Voice over IP (VOIP) or the like.

As noted above the caller communication system 110, in the depicted example, communicates with local devices 114-118 via a wireless communication protocol. Any wireless communication protocol may be utilized and any wireless transceiver mechanism that is able to send interrogation signals and receive responsive communication signals having device identifiers may be used without departing from the spirit and scope of the present invention. It should be appreciated that while a wireless communication is implemented in the illustrative embodiments since it is expected that the local devices 114-118 and/or the caller communication system 110 are portable or mobile devices, the illustrative embodiments are not limited to such. Rather, wired communication may also be utilized with local devices 114-118 which are not mobile or portable and instead may be more fixtures in the local vicinity of the caller communication system 110.

The caller communication system 110 is configured with logic for initiating an interrogation of local devices 114-118 via the wireless transceiver mechanism 112 in response to the initiation of an outgoing communication, e.g., in response to the caller communication system 110 initiating a call to a called party communication system 150. For example, in response to the caller communication system 110 beginning to dial a telephone number for the called party communication system 150, interrogation signals may be broadcast using a short range communications protocol, such as Bluetooth, WiFi, or the like. Responsive to the receipt of such interrogation signals, the local devices 114-118, similarly equipped with wireless transceivers, may respond with responsive signals including their unique device identifiers, e.g. MAC addresses, serial numbers, or other unique device identifiers.

The local devices 114-118 may be any type of computing device that is capable of wired or wireless communication with the caller communication system 110. For example, the local devices 114-118 may comprise wearable or portable devices, such as fitness trackers, smart watches, Bluetooth headphones, mobile telephones, personal digital assistants, or any other computerized device, generally referred to as Internet of Things (IoT) devices. The local devices 114-118 may, in response to an interrogation signal, perform a handshake or heartbeat response that provides a unique identifier of the device in the responsive communication signal sent back to the source of the interrogation signal.

The unique identifiers of the local devices 114-118 at the physical location or premises of the caller communication system 110 may be received by the caller communication system 110 and combined to generate a signature of the local devices 114-118 present at the physical location. The signature of the local services 114-118 may transmitted along with the communication signals to the telecommunications/data network 120 for use in establishing a communication connection with the called party communication system 150. The communication signals may be processed by the communication service carrier or provider systems 130, e.g., telephone carrier or the like, to retrieve source identifier information, e.g., caller-ID information, and provide routing and establishment of communication connections between communication systems 110 and 150 via the one or more telecommunication/data networks 120 in a manner generally known in the art. For example, the telephone carrier may maintain a caller-ID database 132 from which caller-ID information is retrieved based on an identifier of the source communication system 110 and a lookup operation, with subsequent sending of the caller-ID information along with the communication signals for establishing the communication connection with the called party communication system 150.

Extending the known functionality for providing caller-ID information using the carrier systems 130 and caller-ID database 132, the illustrative embodiments further provide a caller-ID verification system 140 for verifying the caller-ID information retrieved by the carrier systems 130 from the caller-ID database 132. Although shown as a separate system in FIG. 1 for purposes of illustration, it should be appreciated that in some illustrative embodiments, the caller-ID verification system 140 may be integrated with the carrier systems 130 and the caller-ID database 132. For example, the authorized caller registry 142 may be an extension of the entries in the caller-ID database 132 and entries in the authorized caller registry 142 may be linked with corresponding entries in the caller-ID database 132.

As shown in FIG. 1, the caller-ID verification system 140 comprises the authorized caller registry 142 and a cognitive verification engine 144 that operates on the received signature information from the caller communication system 110 and the device identifier information for authorized callers in the authorized caller registry 142 to determine a probability or confidence score indicating a likelihood that the caller-ID information associated with the communication accurately reflects the actual source communication system 110. Based on the results of the cognitive analysis performed by the cognitive verification engine 144, i.e. the probability or confidence score, a corresponding verification notification may be sent with the caller-ID information and the communication signals for establishing the communication connection with the called party communication system 150.

The authorized caller registry 142 may be generalized to a plurality of potentially called parties, such as in the case of a telecommunication services provider wide registry, or may be specific to a particular called party, e.g., a particular subscriber to the services of the telecommunication services provider. For example, similar to a whitelist or blacklist mechanism, an authorized caller registry 142 may be established for each called party communication system 150 that indicates which callers are considered authorized by the owners of the particular called party communication system 150. For example, a subscriber John Doe may establish a personal registry 142 of authorized callers with whom he wants to communicate. These individuals may register their personal devices 114-118 with the registry 142 for caller-ID verification in accordance with the illustrative embodiments using a registration process that wirelessly interrogates the devices 114-118 present in the local vicinity of the authorized callers' communication systems 110, and records the unique identifier information for these devices 114-118 in the registry 142. In some illustrative embodiments, when a subscriber registers with the telecommunication services provider, the subscriber may register their valid unique device identifiers through a registration process that wirelessly interrogates the devices for their unique device identifiers, e.g., Media Access Control (MAC) addresses, serial numbers, or the like, and this information may be added to caller-ID information in a caller-ID database 132 or as a separate authorized caller registry 142. The authorized caller registry 142 and caller-ID database 132 comprise data storage and corresponding logic for storing and accessing data present in the registry and database.

The authorized caller registry 142 identifies the authorized callers and their corresponding valid device identifiers of devices 114-118 that the authorized callers have at the source of calls associated with the authorized callers. For example, the authorized callers may each register devices 114-118 that are able to be wirelessly interrogated and which are present either on the person of the caller or in the physical location of the source communication system 110 used to initiate communications, e.g., devices present within a local vicinity of the caller's home, office, or other physical premises. It should be appreciated that while this registration process may identify a plurality of devices 114-118 associated with an authorized caller, not all of these devices will necessarily always be within the local vicinity of the caller communication system 110 or may not always be operational. Thus, a cognitive evaluation of the actual devices determined to be local and operational is performed to provide a probability or confidence score that the communication is originating from an authorized caller.

The caller-ID verification system 140 may comprise a cognitive verification engine 142 that evaluates received communication information, including the caller-ID information retrieved from the caller-ID database 132, the local device signature information received from the caller communication system 110 based on the interrogation of local devices 114-118, and the like, against information provided in the authorized caller registry 142 to determine a likelihood or probability that the caller-ID information accurately identifies the actual source of the communication, i.e. the caller communication system 110. The caller-ID verification system 140 may be provided as part of a cloud computing system or service and thus, may be implemented using one or more computing devices, e.g., server computing systems, database systems, or the like.

The caller-ID verification system 140 employs logic for performing a weighted evaluation and probability determination as to whether or not the corresponding device identifier information being verified should be verified as being associated with the caller-ID information of an authorized caller associated with the communication, i.e. that the caller-ID information purported is in fact the correct caller-ID information for the caller communication system 110. The caller-ID verification system 140 employs an artificial intelligence engine 144 to evaluate the local device signature received against the authorized device identifiers associated with the caller-ID information retrieved from the caller-ID database 132. In some illustrative embodiments, the engine 144 implements a fuzzy logic or weighted evaluation logic to weight the various portions of the local device signature and/or authorized device identifier evaluations and determine a probability or confidence score indicative of whether the caller-ID information is accurate to the caller communication system 110 or not, i.e. whether the caller-ID information is verified or not verified. This probability or confidence score may be compared against a threshold indicating a minimum level of confidence required to return a result that the caller-ID information is verified, e.g., a 80% probability or confidence.

In some illustrative embodiments, the engine 144 implements a neural network, cognitive computing system, or other machine learning computing system that is trained to evaluate the various device identifier information in the local device signature and the authorized device identifiers in the registry 142 to determine whether the caller-ID information is verified or not. In such embodiments, the engine 144 is trained using a supervised learning operation or other machine learning operation for iteratively evaluating the results generated by the engine 144 against a ground truth and adjusting operational parameters, e.g., weights of nodes, of the engine 144 so as to minimize an error or loss in the output generated by the engine 144 until the error/loss is equal to or below a predetermined threshold The trained engine 144 may evaluate the input local device signature, if any, transmitted from the caller communication system 110 against the registered unique device identifiers associated with the caller-ID information associated with the communication from the caller communication device 110. The trained engine 144 may then determine, based on a degree of matching, and which portions of the signature match the registered device identifiers, a probability or confidence score indicative of whether the caller-ID information authentically identifies the caller communication system 110 or not.

For example, the caller communication system 110 may have identified a smartphone (device 114), a Bluetooth headset (device 116), and a smart watch (device 118) as being present within the local vicinity of the caller communication system 110 when the communication is initiated. This device identification information may be transmitted to the caller-ID verification system 140 as part of the communication information. The cognitive verification engine 144 may perform a look-up of the device identifiers, associated with the caller-ID information retrieved from the database 132, in the authorized caller registry 142 and retrieve the corresponding unique device identifier information corresponding to the caller-ID information.

Each unique device identifier for each registered device associated with the authorized caller (e.g., the smartphone, Bluetooth headset, and smart watch) may have an associated weight in the unique device identifier information retrieved from the authorized caller registry 142. The cognitive verification engine 144 determines which device identifiers specified in the received local device signature information match the registered unique device identifiers for the caller-ID. The corresponding weights associated with the matching identifiers are then used to generate a probability or confidence score. The resulting probability or confidence score may then be compared to a threshold to determine if there is sufficient probability or confidence to verify the caller-ID information or not. A corresponding "verified" or "not verified" output is generated by the engine 144 and a notification is added to the communication signals or data sent to the called party communication system 150 to cause a corresponding notification to be output at the called party communication system 150, such as via the caller-ID notification system 152 or caller-ID verification output device 154.

The weights associated with the devices, in some illustrative embodiments, may be learned through a machine learning process and associated with the different devices of the authorized caller and may be specific to the particular authorized caller or may be generalized for a plurality of different users. For example, the presence of different devices in the local vicinity of the caller communication system 110 may be more or less indicative of the actual caller being the source of the communication initiated from the caller communication system 110. For example, a higher weight may be associated with a user's Bluetooth headset as opposed to a fitness tracker, based on the likelihood that an unscrupulous party may have access to the unique identifiers of these devices, e.g., fitness trackers are often registered with online services and thus, there is a possibility for a third party to get access to this information, however a Bluetooth headset does not necessarily require registration with an online service. Various reasoning and implementation details may result in different weightings of device identifiers.

In some embodiments, rather than having the weights specified in the authorized caller device information obtained from the authorized caller registry 142, for example, in embodiments where trained neural networks or other cognitive logic are used to implement the engine 144, the weights are learned operational parameters of the engine 144, e.g., learned weights associated with nodes of layers of the neural networks. It should be appreciated that in such embodiments, the authorized caller registry 142 may be used to match the received local device signature information in the communication information to valid device information associated with the authorized caller whose caller-ID information is being used by the caller, while the neural network applies the various weights to the matched/mismatched device information in order to cognitively determine a probability or confidence that the caller-ID information is valid or not.

Thus, for example, in one illustrative embodiment, the matching device information from the authorized caller registry 142 is used to combine associated weights to generate a score, e.g., there may be a weight of 50 associated with the user's mobile phone, a weight of 10 associated with the user's Bluetooth headset, and a weight of 30 associated with the user's smart watch, which if all are matched with the local device signature information in the communication information, provides a score of 90. This score may then be compared against a threshold value of, for example, 80 which indicates that the caller-ID information retrieved from the caller-ID registry 132 is likely the actual caller-ID information of the caller communication system 110 from which the communication is initiated. Similarly, using a neural network based evaluation, the neural network may compare the received local device signature information in the communication information to the registered devices for the authorized user associated with the caller-ID information and based on the matching/mismatching, and weights associated with corresponding nodes in the neural network, may generate a probability value or confidence score indicating a level of confidence or probability that the caller-ID information is actually associated with the caller communication system 110, e.g., a 90% probability, which can then be compared to a threshold probability or confidence score value to determine whether the caller-ID information is verified or not verified.

In response to the cognitive verification system 144 determining that there is a sufficient level of matching between device identifiers in the local device signature information with registered device identifiers associated with the authorized caller corresponding to the caller-ID information retrieved from the caller-ID database 132, as indicated by the probability or confidence score generated, the cognitive verification system 144 outputs a "verified" output which is then added to the communication signals or data sent to the called communication system 150. In response to the cognitive verification system 144 determining that there is an insufficient level of matching between device identifiers in the local device signature information with registered device identifiers associated with the authorized caller corresponding to the caller-ID information retrieved from the caller-ID database 132, as indicated by the probability or confidence score generated, the cognitive verification system 144 outputs a "not verified" output which is then added to the communication signals or data sent to the called communication system 150.

At the called communication system 150, the received communication signals or data cause the called communication system 150 to output the caller-ID information retrieved from the caller-ID database 132, such as via a caller-ID notification system 152. In addition, the called communication system 150 outputs an indicator of whether or not the caller-ID information has been verified via the caller-ID verification output device 154. It should be appreciated that in some illustrative embodiments, the caller-ID verification output device 154 may be integrated with the caller-ID notification system 152 such that the caller-ID information may be output along with an indicator of whether that caller-ID information is considered verified or not. In some illustrative embodiments, the verified or not verified status of the caller-ID information may be displayed as an icon, graphical feature of the caller-ID information, e.g., a background color, text color, text font, etc., as a separate textual message, or the like. In some cases, the caller-ID verification information may be output as voice output indicating whether the caller-ID information is verified or not.

Thus, based on the caller-ID information displayed or otherwise output by the caller-ID notification system 152 the called party is given an indication as to the party that the caller purports to be. Based on the caller-ID verification output, the called party is given an indicator of whether or not the called party can rely on the caller-ID information specified in the output of the caller-ID notification system 152. Hence, the called party is given greater information as to whether or not to trust the caller-ID information, thereby minimizing the likelihood that the called party will be a victim of caller-ID spoofing.

It should be appreciated that in the case of an fraudster party attempting to adopt the persona of a particular caller-ID, the fraudster will either not provide local device signature information when initiating the communication, or will provide a local device signature that will likely have little if any elements that match the registered devices associated with the caller-ID that the fraudster is adopting. Hence, with the verification mechanisms of the illustrative embodiments, such fraudsters will be identified, and corresponding warnings provided to the called parties in terms of the caller-ID verification notifications. Meanwhile, authorized callers will likely have the devices that they have registered near them when initiating communications and thus, will be accurately identified as authentic and their caller-ID information verified.

Figure 2:
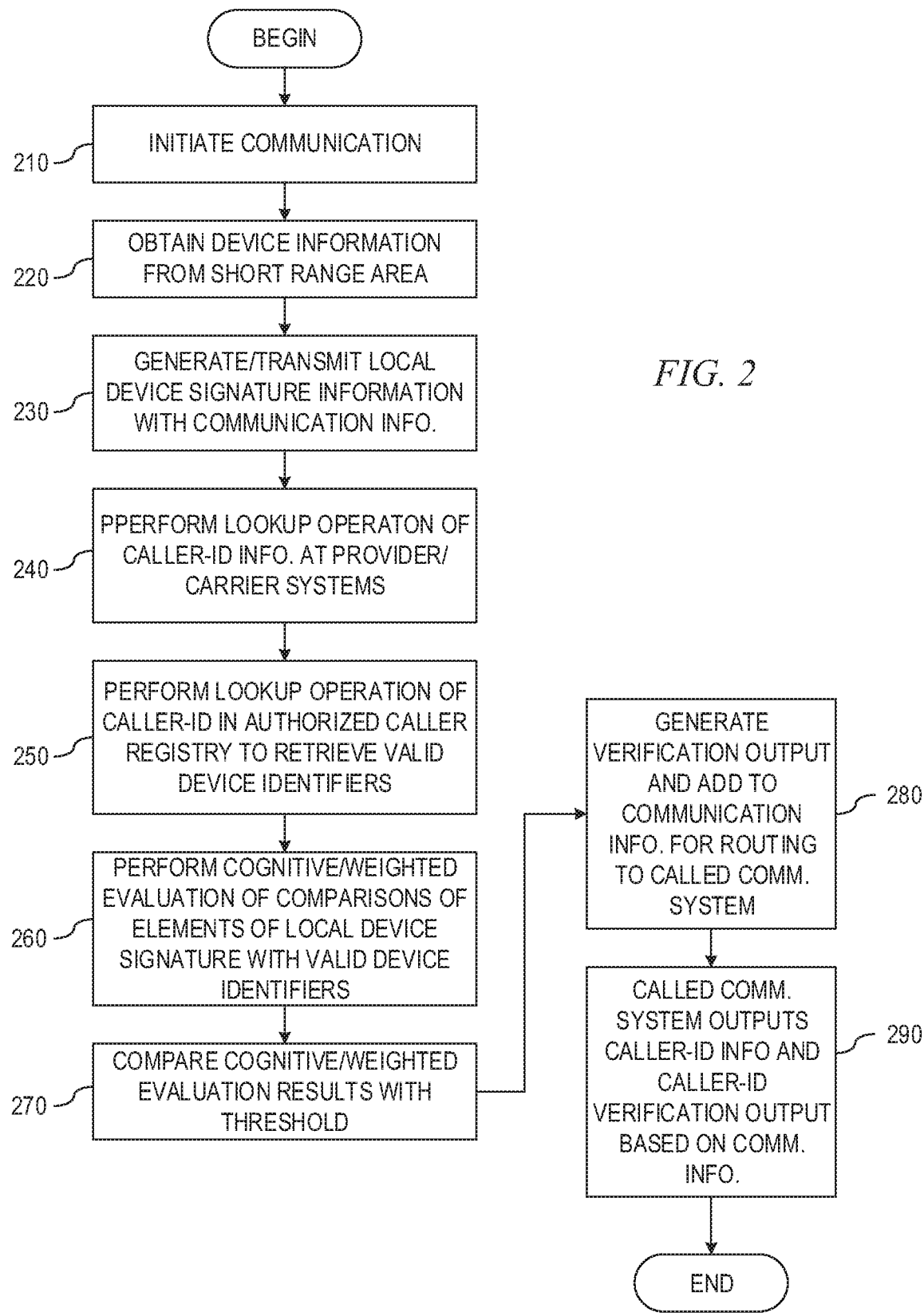
FIG. 2 is a flowchart outlining an example overall operation for caller identification verification in accordance with one illustrative embodiment.

FIG. 2 is a flowchart outlining an example overall operation for transaction verification in accordance with one illustrative embodiment. In the operation outlined in FIG. 2, it is assumed that authorized callers have already registered their unique device identifiers for their devices that they wish to use as a basis for verifying their caller-ID information to called parties. This registration process may be performed when the authorized callers establish a profile with the communication service provider or carrier systems, for example. The resulting authentic caller registry may be a more universal registry accessible by a plurality of different called parties, may be a specific registry for a particular called party, or a combination, e.g., a more universal registry from which personal sub-registries may be generated or created by called parties.

As shown in FIG. 2, the operation starts by initiating, at a communication system, such as a mobile telephone, or the case of a fraudster, a telemarketing system, call center, or other automated caller system, a communication (step 210). The communication system performs a short range wireless communication interrogation of devices within a short range of the communication system that initiates the communication, and gathers the corresponding local device identifier information (step 220). The gathered device identifier information is combined to generate a local device signature that is associated with the communication (step 230). It should be appreciated that a fraudster may attempt to spoof this process by providing false local device information, however, they are unlikely to have the particular combination of registered device identifiers for the particular caller whose identity they are attempting to adopt. Alternatively, the fraudster may not provide any device identifier information or a local device signature in the communication. However, for purposes of FIG. 2, it is assumed that the caller is an authorized caller.

The communication signals or data, including the local device signature, are forwarded to telecommunications service provider or carrier systems which perform a lookup operation of the caller-ID information for the caller communication system (step 240). The caller-ID information is used by the caller-ID verification system to perform a lookup operation in the authorized caller registry of the device identifiers associated with an authorized caller to which the caller-ID information corresponds (step 250). The caller-ID verification systems then performs a cognitive or weighted verification of the local device signature information received with the communication signals/data and the registered devices associated with the authorized caller present in the registry (step 260).

The caller-ID verification system may implement a cognitive computing system that is trained to weigh the various matching devices as described previously. For example, the authentic caller registry may store, or the cognitive computing system may associate, with each trusted device a value between 1 and 100, which may be based on the mobility of the device and the historical usage of the device. For example, a weight of a fitness tracker may be set to 30 because the fitness tracker is extremely mobile, but could be taken by someone other than the user. However, the fitness tracker may have been in the local vicinity of the caller communication system 4 of the last 5 verified communications. Additionally, a wireless speaker in the user's home may be given a weight of 50 because it is not mobile, but has only been in 1 of the last 5 verified communications.

In some embodiments, the weight of a device may be increased the more times the device is present and/or used during a caller-ID verification operation. For example, because the fitness tracker has been present at 4 of the last 5 verified communications, the caller-ID verification engine may increase the weight to 50 because it is assumed the fitness tracker is a trusted device that is usually near the authenticated caller. In some embodiments, the caller-ID verification engine and/or authorized caller registry may identify devices that are present in the local vicinity of the caller communication system but have never been verified as authentic device information for the authorized caller and the caller-ID verification engine may give these devices no weight (e.g., marking the devices as noise).

The weighted evaluation and/or cognitive evaluation may combine the weights associated with the various devices to generate a weighted evaluation of the probability or confidence that the combination of devices specified in the local device signature in the received communication information matches the registered devices of the authorized caller associated with the caller-ID information retrieved for the caller communication system (step 260). In some embodiments, any statistical combination of the weights may be used (e.g., averaging, adding, etc.) or any cognitive evaluation of the device information may be utilized. Moreover, the weighted or cognitive evaluation may further compare the resulting confidence score or probability determination against a predetermined threshold value to determine if a sufficient minimum level of probability or confidence is achieved to indicate that the caller-ID information is verified or not (step 270).

A corresponding verification output is generated and added to the communication signals/data for routing to the called communication system (step 280). At the called communication system, the caller-ID output mechanism further outputs an indication of whether or not the caller-ID information that is output has been verified or not by the caller-ID verification system (step 290). The operation then terminates.

As noted above, while the illustrative embodiments utilize the example of caller-ID information for telecommunications as the identity information being verified by the illustrative embodiments, the illustrative embodiments are applicable to other types of communications including, but not limited to, electronic mail communications, instant messaging communications, text messaging communications, and the like. For example, in response to an electronic mail message being sent, the mechanisms of the illustrative embodiments may be used to verify the identify of the sender based on local device identifier signature information included with the electronic mail message. For example, in such a case, the authentic caller registry may be implemented in an electronic mail server which performs the sender identification verification on electronic mail messages that pass through the electronic mail server. Similar implementations may be performed with regard to other types of communications as well. Moreover, verification notifications may be likewise output in association with the identity of the originator or the communication so as to inform recipients as to whether they can rely on the identity of the originator or not.

Figure 3:
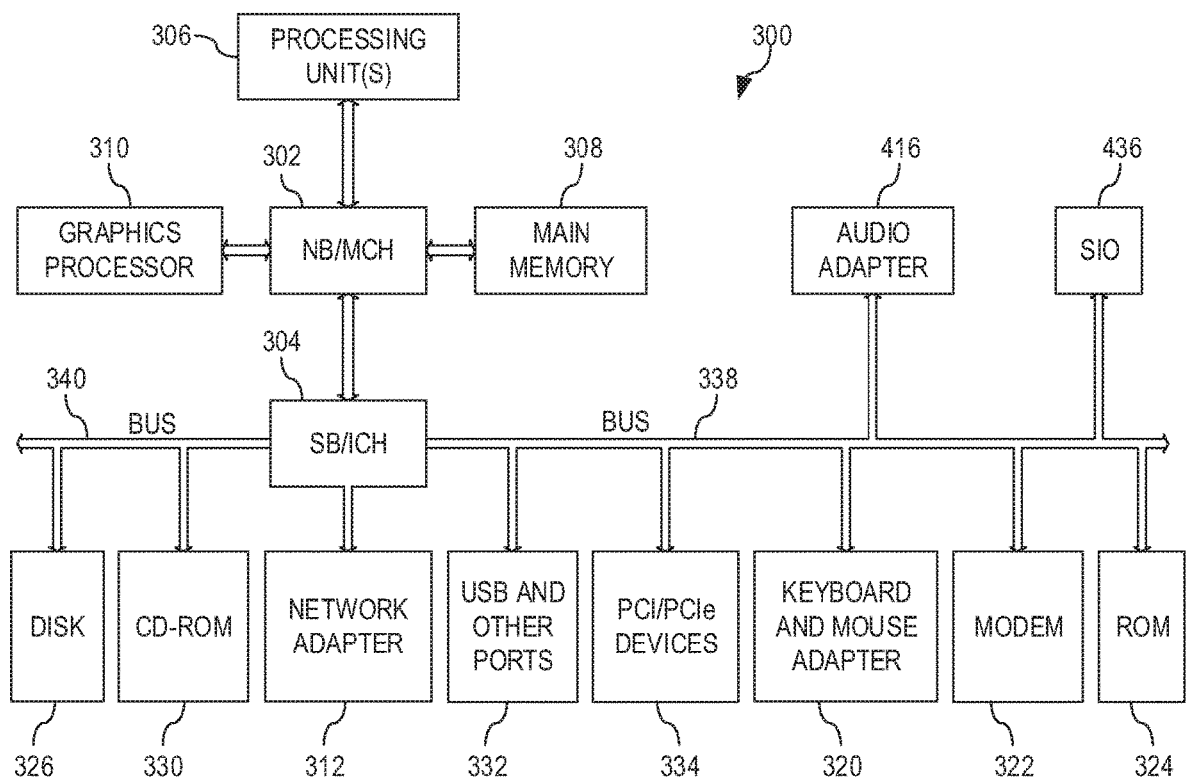
FIG. 3 is a block diagram of just one example data processing system in which aspects of the illustrative embodiments may be implemented.
Figure 4:
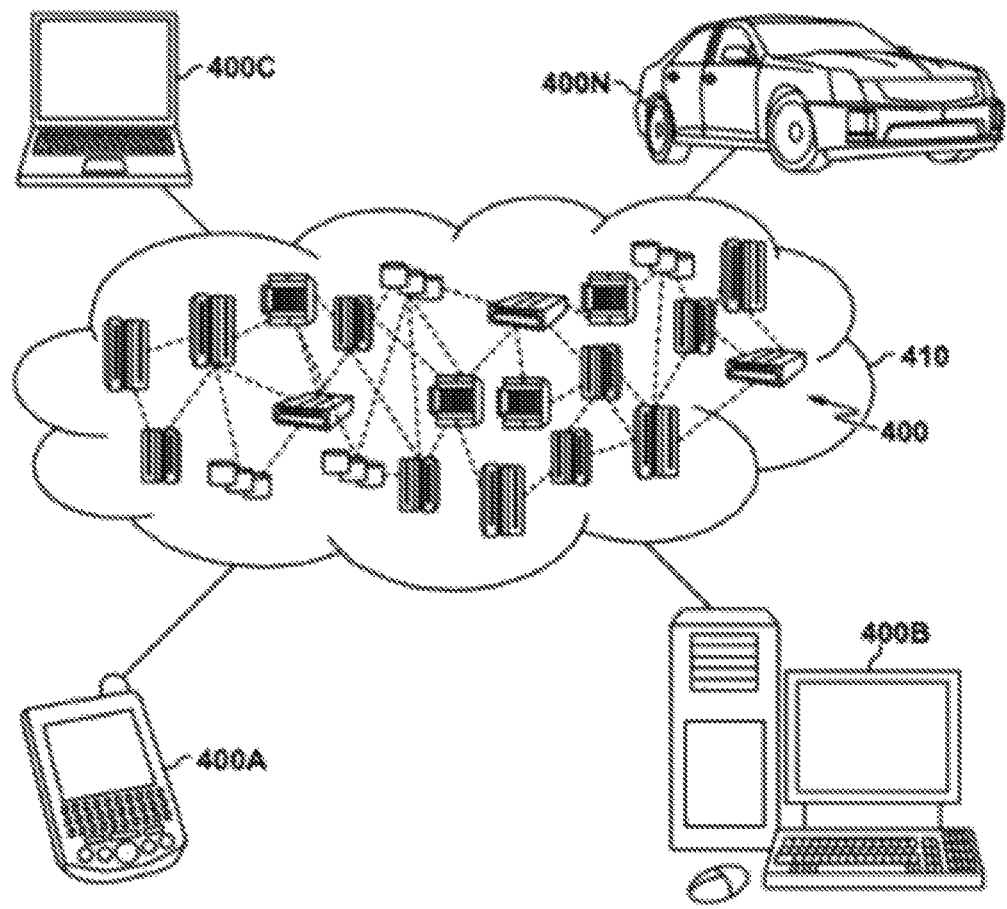
FIG. 4 is an example diagram illustrating a cloud computing environment in which aspects of the illustrative embodiments may be implemented.
Figure 5:
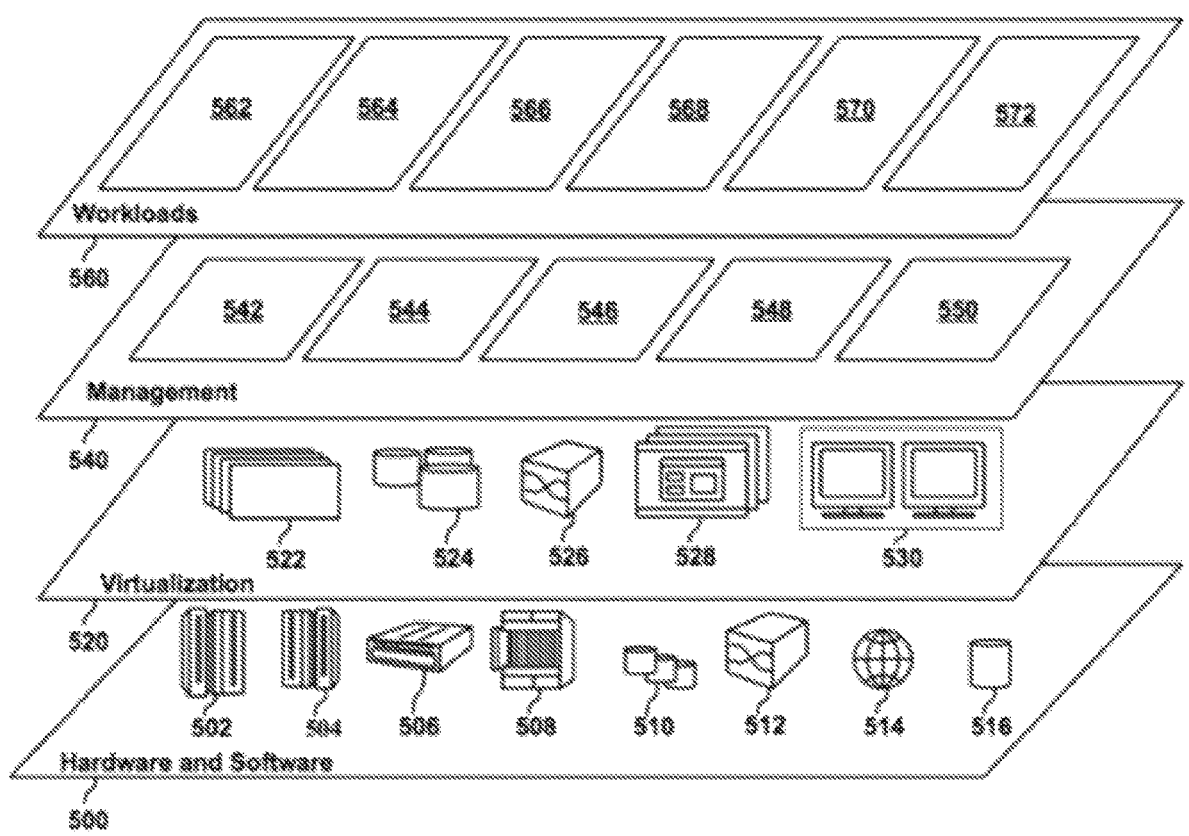
FIG. 5 is an example diagram illustrating a set of functional abstraction layers provided by cloud computing environment in which aspects of the illustrative embodiments may be implemented.

As is apparent from the above description, the illustrative embodiments provide an improved computer tool for verifying the purported identity of the source of a communication. Thus, the illustrative embodiments may be utilized in many different types of data processing environments. In order to provide a context for the description of the specific elements and functionality of the illustrative embodiments, FIGS. 3-5 are provided hereafter as example environments in which aspects of the illustrative embodiments may be implemented. It should be appreciated that FIGS. 3-5 are only examples and are not intended to assert or imply any limitation with regard to the environments in which aspects or embodiments of the present invention may be implemented. Many modifications to the depicted environments may be made without departing from the spirit and scope of the present invention.

The mechanisms of the illustrative embodiments may utilize specifically configured computing devices, or data processing systems, in these various environments to perform the operations for performing cognitive transaction verification, such as described in accordance with one or more of the illustrative embodiments set forth above. These computing devices, or data processing systems, may comprise various hardware elements which are specifically configured, either through hardware configuration, software configuration, or a combination of hardware and software configuration, to implement one or more of the systems/subsystems described herein.

FIG. 3 is a block diagram of just one example data processing system in which aspects of the illustrative embodiments may be implemented. Data processing system 300 is an example of a computer, such as server computing device in which one or more of the elements of the caller-ID verification system 140 in FIG. 1 may be implemented. For example, computer usable code or instructions implementing the processes and aspects of the illustrative embodiments of the present invention may be located and/or executed by the data processing system 300 so as to achieve the operation, output, and external effects of the illustrative embodiments as described herein.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows 10° or the like. An object-oriented programming system, such as the Java™ programming system, may run in conjunction with the operating system and provides calls to the operating system from Java™ programs or applications executing on data processing system 200. Various virtual machines (VMs) and virtual machine management (VMM) mechanisms may also be provided for implementing elements of the illustrative embodiments.

As a server, data processing system 300 may be, for example, an IBM eServer™ System p° computer system, Power™ processor based computer system, or the like, running the Advanced Interactive Executive (AIX®) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

As mentioned above, in some illustrative embodiments the mechanisms of the illustrative embodiments may be implemented as application specific hardware, firmware, or the like, application software stored in a storage device, such as HDD 326 and loaded into memory, such as main memory 308, for executed by one or more hardware processors, such as processing unit 306, or the like. As such, the computing device shown in FIG. 3 becomes specifically configured to implement the mechanisms of the illustrative embodiments and specifically configured to perform the operations and generate the outputs described herein with regard to the transaction verification system and methodology.

Those of ordinary skill in the art will appreciate that the hardware in FIGS. 1 and 3 may vary depending on the implementation. Other internal hardware or peripheral devices, such as flash memory, equivalent non-volatile memory, or optical disk drives and the like, may be used in addition to or in place of the hardware depicted in FIGS. 1 and 3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

As previously mentioned above, in some illustrative embodiments, the caller-ID verification system 140 may be implemented as part of a cloud computing system. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Referring now to FIG. 5, a set of functional abstraction layers provided by cloud computing environment, e.g., cloud computing environment 410 in FIG. 4, is shown. It should be understood in advance that the components, layers, and functions shown in FIG. 5 are intended to be illustrative only and embodiments of the invention are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators.

Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and caller-ID verification system 572. The caller-ID verification system 572 may comprise the various engines, logic, data structures, and the like, in the workloads layer 560 for implementing the mechanisms of the illustrative embodiments. As noted above, these mechanisms may be distributed across multiple physical and/or logical computing devices that together operate to provide the caller-ID verification system 572.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions that are executed by the at least one processor to cause the at least one processor to be specifically configured to implement a communication source identifier verification system, wherein the method comprises:

receiving, by the communication source identifier verification system, communication information for a communication initiated between a source communication system and a destination communication system, wherein the communication information comprises a source identifier and a local device identifier signature specifying zero or more local device identifiers of devices local to the source communication system;

retrieving, by the communication source identifier verification system, valid device identifier information for an authorized communication source corresponding to the identifier of the source communication system, wherein retrieving valid device identifier information for an authorized communication source corresponding to the identifier of the source communication system comprises accessing an authorized caller registry entry corresponding to the identifier of the source communication system, wherein the authorized caller registry entry comprises a listing of two or more device identifiers as being valid device identifiers associated with an authorized caller;

executing, by the communication source identifier verification system, a verification operation that verifies whether the source identifier is validly associated with the source communication system based on the retrieved valid device identifier information and the local device identifier signature, wherein executing the verification operation comprises:

comparing the zero or more local device identifiers to the two or more device identifiers in the authorized caller registry entry; and determining a probability value indicating a probability that the source identifier is validly associated with the source communication system based on results of the comparison; and sending, by the communication source identifier verification system, a verification notification along with the communication information, in response to results of executing the verification operation, to the destination communication system.

2. The method of claim 1, wherein:

the source communication system, in response to initiating the communication, performs a short range interrogation of devices present in a near field area around the source communication system, the source communication system receives responses, from one or more devices local to the source communication system, specifying corresponding unique local device identifiers of the devices, and the local device identifier signature comprises the unique local device identifiers of the devices received in the responses from the one or more devices local to the source communication system.

3. The method of claim 1, wherein the source identifier is caller-ID information obtained from a telecommunications service provider computing system, and wherein the verification operation verifies that the caller-ID information is validly associated with the source communication system and is not spoofed caller-ID information.

4. The method of claim 1, wherein determining the probability value comprises performing a cognitive computing evaluation of the comparison using machine learned weightings of the local device identifiers associated with different types of local devices.

5. The method of claim 1, further comprising:
comparing the probability value to at least one threshold probability value; and
determining that the source identifier is validly associated with the source communication system in response to the probability value having a predetermined relationship relative to the at least one threshold probability value.

6. The method of claim 1, wherein the authorized caller registry entry is in an authorized caller registry data structure, wherein the authorized caller registry data structure is a customized data structure specific to the destination communication system, and wherein different destination communication systems have different associated authorized caller registry data structures.

7. The method of claim 1, wherein adding the verification notification to the communication information comprising adding a notification indicating whether or not the source identifier is validly associated with the source communication system such that the destination communication system outputs the verification notification along with the source identifier.

8. The method of claim 1, wherein the verification notification is an extended caller-ID display message that is output on a display associated with the destination communication system.

9. A computer program product comprising a computer readable storage medium having a computer readable program stored therein, wherein the computer readable program, when executed on a data processing system, causes the data processing system to implement a communication source identifier verification system that operates to:
receive communication information for a communication initiated between a source communication system and a destination communication system, wherein the communication information comprises a source identifier and a local device identifier signature specifying zero or more local device identifiers of devices local to the source communication system;
retrieve valid device identifier information for an authorized communication source corresponding to the identifier of the source communication system, wherein the computer readable program further causes the communication source identifier verification system to retrieve valid device identifier information for an authorized communication source corresponding to the identifier of the source communication system at least by accessing an authorized caller registry entry corresponding to the identifier of the source communication system, wherein the authorized caller registry entry comprises a listing of two or more device identifiers as being valid device identifiers associated with an authorized caller;
execute, by the communication source identifier verification system, a verification operation that verifies whether the source identifier is validly associated with the source communication system based on the retrieved valid device identifier information and the local device identifier signature, wherein the computer readable program further causes the communication source identifier verification system to execute the verification operation at least by:
comparing the zero or more local device identifiers to the two or more device identifiers in the authorized caller registry entry; and
determining a probability value indicating a probability that the source identifier is validly associated with the source communication system based on results of the comparison; and
send a verification notification along with the communication information, in response to results of executing the verification operation, to the destination communication system.

10. The computer program product of claim 9, wherein:
the source communication system, in response to initiating the communication, performs a short range interrogation of devices present in a near field area around the source communication system,
the source communication system receives responses, from one or more devices local to the source communication system, specifying corresponding unique local device identifiers of the devices, and
the local device identifier signature comprises the unique local device identifiers of the devices received in the responses from the one or more devices local to the source communication system.

11. The computer program product of claim 9, wherein the source identifier is caller-ID information obtained from a telecommunications service provider computing system, and wherein the verification operation verifies that the caller-ID information is validly associated with the source communication system and is not spoofed caller-ID information.

12. The computer program product of claim 9, wherein the computer readable program further causes the communication source identifier verification system to determine the probability value at least by performing a cognitive computing evaluation of the comparison using machine learned weightings of the local device identifiers associated with different types of local devices.

13. The computer program product of claim 9, wherein the computer readable program further causes the communication source identifier verification system to:
compare the probability value to at least one threshold probability value; and
determine that the source identifier is validly associated with the source communication system in response to the probability value having a predetermined relationship relative to the at least one threshold probability value.

14. The computer program product of claim 9, wherein the authorized caller registry entry is in an authorized caller registry data structure, wherein the authorized caller registry data structure is a customized data structure specific to the destination communication system, and wherein different destination communication systems have different associated authorized caller registry data structures.

15. The computer program product of claim 9, wherein the computer readable program further causes the communication source identifier verification system to add the verification notification to the communication information at least by adding a notification indicating whether or not the source identifier is validly associated with the source communication system such that the destination communication system outputs the verification notification along with the source identifier.

16. An apparatus comprising:
at least one processor; and at least one memory coupled to the at least one processor, wherein the at least one memory comprises instructions which, when executed by the at least one processor, cause the at least one processor to implement a communication source identifier verification system that operates to:

receive communication information for a communication initiated between a source communication system and a destination communication system, wherein the communication information comprises a source identifier and a local device identifier signature specifying zero or more local device identifiers of devices local to the source communication system;

retrieve valid device identifier information for an authorized communication source corresponding to the identifier of the source communication system, wherein the instructions further cause the communication source identifier verification system to retrieve valid device identifier information for an authorized communication source corresponding to the identifier of the source communication system at least by accessing an authorized caller registry entry corresponding to the identifier of the source communication system, wherein the authorized caller registry entry comprises a listing of two or more device identifiers as being valid device identifiers associated with an authorized caller;

execute, by the communication source identifier verification system, a verification operation that verifies whether the source identifier is validly associated with the source communication system based on the retrieved valid device identifier information and the local device identifier signature, wherein the instructions further cause the communication source identifier verification system to execute the verification operation at least by:
  comparing the zero or more local device identifiers to the two or more device identifiers in the authorized caller registry entry; and
  determining a probability value indicating a probability that the source identifier is validly associated with the source communication system based on results of the comparison; and send a verification notification along with the communication information, in response to results of executing the verification operation, to the destination communication system.

17. The apparatus of claim 16, wherein:
the source communication system, in response to initiating the communication, performs a short range interrogation of devices present in a near field area around the source communication system,
the source communication system receives responses, from one or more devices local to the source communication system, specifying corresponding unique local device identifiers of the devices, and
the local device identifier signature comprises the unique local device identifiers of the devices received in the responses from the one or more devices local to the source communication system.

18. The apparatus of claim 16, wherein the instructions further cause the communication source identifier verification system to determine the probability value at least by performing a cognitive computing evaluation of the comparison using machine learned weightings of the local device identifiers associated with different types of local devices.

19. The apparatus of claim 16, wherein the instructions further cause the communication source identifier verification system to:
  compare the probability value to at least one threshold probability value; and
  determine that the source identifier is validly associated with the source communication system in response to the probability value having a predetermined relationship relative to the at least one threshold probability value.

20. The apparatus of claim 16, wherein the authorized caller registry entry is in an authorized caller registry data structure, wherein the authorized caller registry data structure is a customized data structure specific to the destination communication system, and wherein different destination communication systems have different associated authorized caller registry data structures.

* * * * *